Oct. 4, 1949.  L. S. PETERSEN  2,483,738
COOLER
Filed Nov. 9, 1944  2 Sheets-Sheet 1

INVENTOR
LOUIS S. PETERSEN
BY Pennie, Davis, Marvin & Edmonds
ATTORNEYS

Oct. 4, 1949.  L. S. PETERSEN  2,483,738
COOLER

Filed Nov. 9, 1944  2 Sheets-Sheet 2

INVENTOR
LOUIS S. PETERSEN
BY
Pennie, Davis, Marvin & Edmonds
ATTORNEYS

Patented Oct. 4, 1949

2,483,738

UNITED STATES PATENT OFFICE 2,483,738

COOLER

Louis S. Petersen, Forest Hills, N. Y., assignor to F. L. Smidth & Co., New York, N. Y., a corporation of New Jersey Application November 9, 1944, Serial No. 562,697

3 Claims. (Cl. 263—33)

This invention relates to apparatus for the treatment with a gaseous medium of a material passing through a rotary cylindrical shell, an example of such apparatus being a cooler attached to a rotary kiln for passing air through the clinker emerging from the hot zone of the kiln to quench the clinker. More particularly, the invention is concerned with a novel apparatus of this type which is superior to prior apparatus for the same purpose in that it is much less expensive to construct and to operate and to maintain in working order.

The new apparatus may be employed for various purposes such as the quenching and cooling of cement clinker, the cooling of roasted ores, the treatment of roasted products with a gaseous medium to carry out or inhibit a chemical reaction, and the like; but, since the invention affords special advantages in its application to the quenching and cooling of cement clinker, an embodiment of the invention for that purpose will be illustrated and described in detail for purposes of explanation.

The desirability of rapidly cooling or quenching cement clinker immediately upon its issuance from the hot zone of the kiln in order to improve various characteristics of the cement is now well known, and various types of cooling apparatus for this purpose are available. In one such construction, the clinker is discharged from the kiln into a cooler separate and apart from the kiln and provided with its own foundation and drive. While such apparatus is effective for the purpose, it is a considerable item of expense in a cement plant because of both its original cost and the cost of operating and maintaining it.

A second type of apparatus for quenching cement clinker that has been developed heretofore includes a cooler positioned at the discharge end of the kiln to rotate therewith. Internally, such a cooler has a perforated surface formed by grates, and it is encircled by a stationary mantle or wind box through which air is supplied from a fan to pass from the grates through the hot clinker thereon. As the mantle is stationary and the cooler rotates, means must be provided to seal the mantle and the cooler shell, and such a seal must be effective under all conditions of operation. The mantle must, accordingly, be provided with a suitable mounting which will permit the position of the mantle to change as the kiln expands and contracts and which will also take care of any warping of the kiln shell. Even under the most favorable circumstances, there is likely to be leakage of the cooling air so that the apparatus described has the disadvantages of being expensive to construct and also to operate because of the maintenance charges and the cooling air loss.

The present invention is directed to the provision of a novel cooling apparatus which overcomes the disadvantages of the prior apparatus in that it requires no separate foundation or drive, and, although the apparatus takes the form of a cooler mounted on the kiln shell, the cooling air is supplied thereto in such manner that no complicated and expensive seals are required and no leakage of cooling air can take place. The new apparatus comprises a cylindrical cooling section provided with an internal grate surface located near the discharge end of the kiln to receive the hot clinker issuing from the clinkering zone thereof. A wind box is mounted on this cooling section to rotate with the kiln, and air from the wind box is conducted into the cooling section below the grates thereof. Air for this purpose is supplied by a fan mounted on the cooling section or on the kiln shell; and, since the fan and the wind box are mounted on the rotating structure instead of on a stationary base, tight connections may be provided between the outlet of the fan and the points where the air is brought into contact with the hot clinker.

For a better understanding of the invention, reference may be had to the accompanying drawings, in which.

Figure 2:
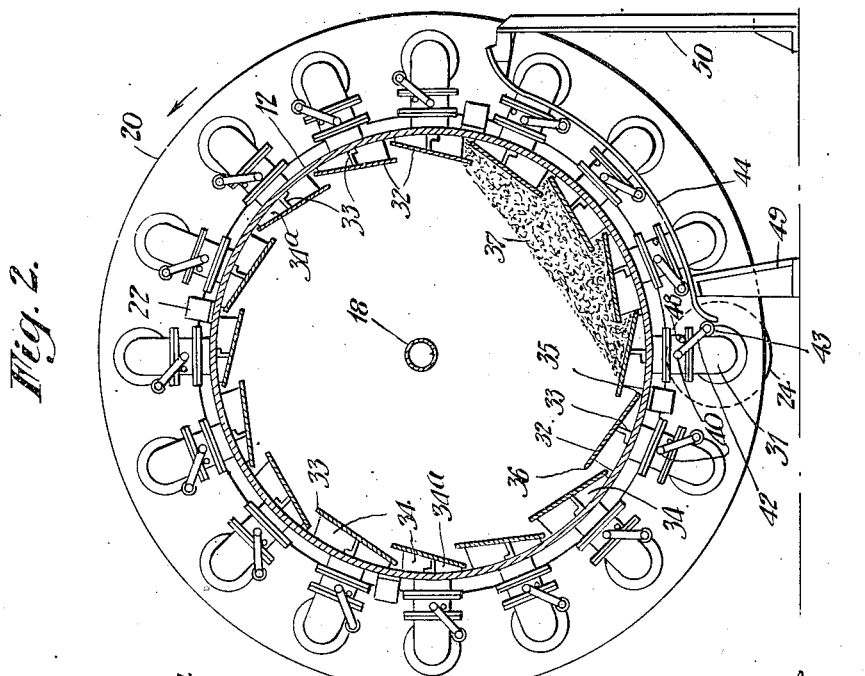
Fig. 2 is a sectional view taken along the line 2—2 of Fig. 1.
Figure 1:
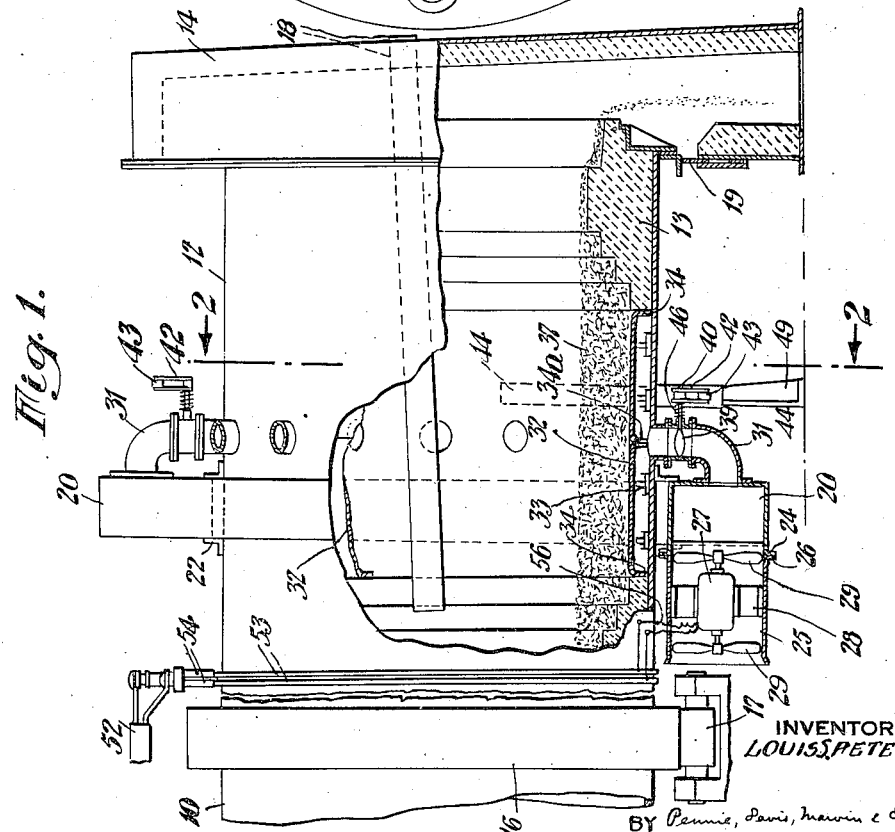
Fig. 1 is an elevational view, with parts in section, of a rotary cement kiln provided with the improved cooling apparatus.

In Fig. 1 I have shown a typical rotary cement kiln 10 provided with the cement-clinker cooling section 12 constructed integrally with the kiln itself. The interior wall of the kiln is provided with the customary lining 13 except at the circumferential portion of the cooling section where the cooling air is introduced into the kiln as hereinafter described. The kiln is mounted to rotate about an axis slightly inclined to the horizontal so that the cement clinker gradually moves therethrough to the discharge hood 14, from which it is removed in any conventional manner.

Support for the kiln near its discharge end is provided by the tire 16, which rests on the rollers 17. Fuel to effect burning of the raw material from which the cement is derived is introduced into the kiln through the pipe 18 positioned in the hood 14. A suitable seal 19 is provided to prevent the leakage of air into or dust out of the discharge end of the kiln.

It is desirable, in the operation of such a cement kiln, to introduce air into the kiln near the discharge end thereof to cool the cement clinker prior to the discharge thereof from the kiln. In accordance with the present invention, this object is accomplished by means of an improved apparatus that is so designed and constructed as to continuously rotate with the kiln as a unitary structure.

This improved apparatus includes the wind box 20, which is circumferentially mounted on the cooling section 12, but spaced therefrom. Angle brackets 22 or the like support the wind box and maintain it in proper position with respect to the kiln, and these angle brackets may be suitably secured to the outer wall of the cooling section, the radial walls of the wind box being similarly secured to the respective angle brackets. One of the radial walls of the wind box is provided with an opening having the flange 24, to which is attached the air chamber 25 by means of its corresponding flange 26. Chamber 25 is preferably arranged axially with respect to the kiln 10.

The chamber 25 contains means for supplying air to the wind box, and in the construction illustrated, a motor 27 is mounted in the chamber on supporting members 28 and drives fans 29 which cause air to be drawn in through the open end of the chamber and discharged directly into the wind box.

The cooling air passes from the wind box into the cooling section of the kiln through a plurality of ducts or conduits 31. Each duct opens through the wall of the cooling section into an air compartment provided at its top with one or more grates 32, which are supported on the wall of the cooling section by brackets 33 and may be provided, if desired, with end stiffening ribs 34 and central stiffening ribs 34a. The grates are inclined so that their leading edges 35 are more remote from the axis of the kiln than their trailing edges 36. The trailing edge of each grate slightly overlaps the leading edge of the succeeding grate so as to form openings through which air may pass to the bed 37 of clinker within the kiln. This arrangement of the grates also prevents clinker from escaping into the ducts.

Each duct 31 is provided with the valve or damper 39, which is mounted on the shaft 40 journaled in suitable bearings in the duct wall. One end of each shaft extends beyond this wall and is secured to one end of the arm 42, on the other end of which the cam follower 43 is positioned. This cam follower runs along the arcuate cam track 44, which has its center in the axis of rotation of the kiln. Spring 46, which is attached at one end to the duct wall and at its other end to the arm 42, serves to return shaft 40 to its original position after the cam follower has run off the cam track, and the stop 48 serves to prevent the spring 46 from turning the shaft 40 beyond the closed position of the valve 39. Cam track 44 is mounted on the supports 49 and 50, which are stationary with respect to the kiln.

Cam track 44 is disposed adjacent the circumferential portion of the kiln occupied by the bed of clinker therein, and with the arrangement described, cooling air is admitted into the kiln only through those ducts 31 which lie beneath the clinker bed. As a result, all the air admitted passes through the clinker and none of it escapes freely into the kiln. Valves 39 within the ducts 31 may, if desired, be constructed to permit a small amount of air to pass through the ducts in the closed position of the valves, such air serving to cool the grates when they are out of contact with the clinker.

Power for operating the fan motor may be supplied from a suitable source through cable 52, the conductors in which are connected to bus bars 53 by means of brushes 54. The bus bars are supported on the kiln in any suitable manner, and leads 56 connect the bus bars with the fan motor.

The improved apparatus of the invention avoids the need for the elaborate sealing arrangements heretofore proposed to prevent leakage of air between the stationary and the moving parts of prior equipment. The provision of complicated apparatus to support the stationary wind box of prior coolers and to compensate for expansion and warping of the kiln shell has also been eliminated by the instant design. The present arrangement provides a unitary construction in which the apparatus for introducing cooling air into the kiln is rotated together with the kiln as a single unit.

Figure 3:
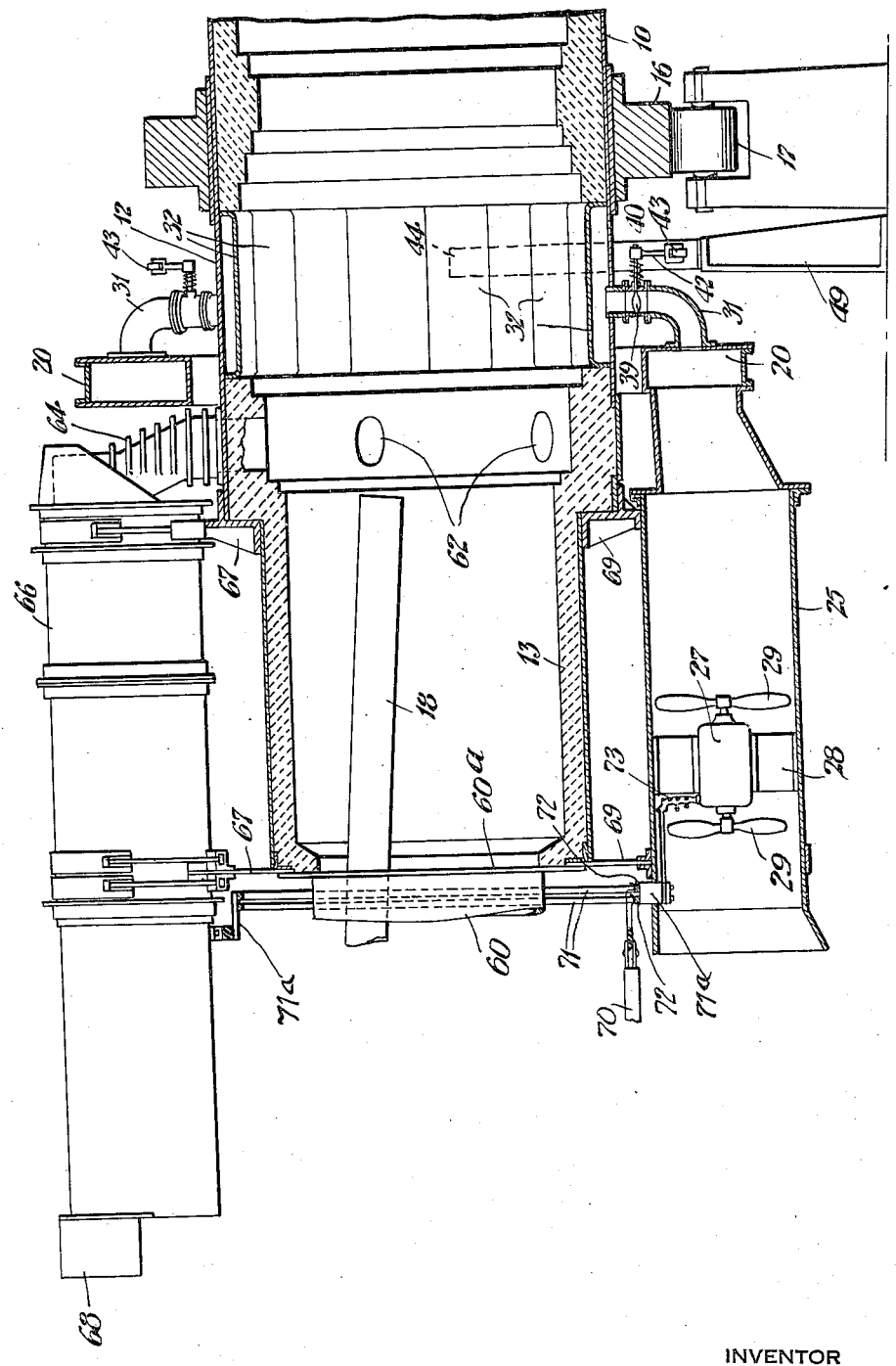
Fig. 3 is an elevational view, with parts in section, of a modified form of rotary cement kiln provided with the improved cooling apparatus.

In Fig. 3, there is illustrated the application of the improved cooling apparatus to a kiln having external cooling chambers. Kiln 10 is closed at its lower end by an end plate 60a which is mounted upon an end shield 60 which supports the fuel pipe 18 and is provided with inspection openings. The kiln is provided with a plurality of circumferentially spaced discharge outlets 62 from which finned discharge conduits 64 lead to respective clinker cooling chambers 66. These chambers are mounted on the exterior of the kiln shell by supporting members 67 and extend axially of the kiln. As the kiln rotates, clinker leaves through openings 62 and passes through conduits 64 into the several chambers, along which it passes to be discharged through the spouts 68 at the discharge ends thereof.

As shown in Fig. 3, one of the cooling chambers 66 of the kiln is replaced by an air chamber 25 which is secured to the exterior of the kiln shell by supporting member 69 and extends axially of the kiln. The chamber 25 is connected, as before, to a wind box 20 which is connected by a number of ducts 31 to air chambers beneath grates 32. With the arrangement described, the clinker leaving the kiln is subjected to a preliminary cooling by air from the wind box entering the clinker through the grates, and after such quenching of the clinker, it passes into the cooling chambers 66 in the usual manner.

A motor 27 is mounted within chamber 25 on supports 28 and drives fans 29, and power for operating the motor may be supplied from a source of power through cable 70 containing conductors connected with annular bus bars 71 through brushes 72. The bus bars are supported in any convenient manner, as on insulated supports 71a attached to cooling chambers 66 and air chamber 25. The bus bars are connected by suitable leads 73 to the motor.

In the appended claims in which reference is made to "air," it is to be understood that the term is intended to include any gaseous medium which it may be desired to introduce into the kiln in accordance with the conditions of a particular operation.

I claim:

1. The combination of a cylindrical kiln shell rotatable about an axis slightly inclined to the horizontal, a pipe for introduction of fuel into the shell, the pipe extending into the lower end of the shell out of contact therewith, said shell having a plurality of circumferentially spaced discharge outlets near its lower end, a plurality of circumferentially spaced chambers mounted externally on the shell, each of said chambers being connected to one of said outlets, an annular wind box mounted on the shell to encircle it, an air chamber mounted on the shell in communication with the wind box, a motor-driven means within the chamber for drawing air into the chamber and supplying it to the wind box, means for conducting air from the wind box into the interior of the shell through circumferentially disposed openings in the shell wall lying upwardly from said outlets, and means for controlling the flow of air from the wind box into the shell operable to admit the major portion of the air through the openings at the bottom of the shell.

2. The combination of a cylindrical kiln shell rotatable about an axis slightly inclined to the horizontal, a pipe extending into the lower end of the shell out of contact therewith for introducing fuel into the shell for combustion within the latter to produce a clinkering zone near said end of the shell, said shell having a plurality of circumferentially spaced discharge outlets between the clinkering zone and the lower end of the shell, a plurality of circumferentially spaced cooling chambers mounted externally on the shell and extending axially thereof, each of said chambers being connected to one of said outlets, an annular wind box mounted on the shell to encircle it, an air chamber mounted on the shell in communication with the wind box, the air chamber lying between a pair of adjacent cooling chambers and extending axially of the shell, power driven means within the air chamber for drawing air into the latter and supplying it to the wind box, and means for introducing air from the wind box into the interior of the shell through a plurality of circumferentially spaced openings through the shell wall lying upwardly along the shell from the outlets and between said outlets and the clinkering zone.

3. The combination of a cylindrical kiln shell rotatable about an axis slightly inclined to the horizontal, a pipe extending into the lower end of the shell out of contact therewith for introducing fuel into the shell for combustion within the latter to produce a clinkering zone near said end of the shell, said shell having a plurality of circumferentially spaced discharge outlets between the clinkering zone and the lower end of the shell, a plurality of circumferentially spaced cooling chambers mounted externally on the shell and extending axially thereof, each of said chambers being connected to one of said outlets, an annular wind box mounted on the shell to encircle it, an air chamber mounted on the shell in communication with the wind box, the air chamber lying between a pair of adjacent cooling chambers and extending axially of the shell, a motor driven fan within the air chamber for drawing air into the latter and supplying it to the wind box, means for introducing air from the wind box into the interior of the shell through circumferentially spaced openings through the shell wall lying upwardly along the shell from the outlets and between said outlets and said clinkering zone, and means for controlling the flow of air through the individual openings.

LOUIS S. PETERSEN.

REFERENCES CITED

The following references are of record in the file of this patent:

UNITED STATES PATENTS

| Number | Name | Date |
|---|---|---|
| 828,555 | Krottnaurer | Aug. 14, 1906 |
| 1,071,303 | Dreisbach et al. | Aug. 26, 1913 |
| 1,238,394 | Eldred | Aug. 28, 1917 |
| 1,830,959 | Petersen | Nov. 10, 1931 |
| 2,173,182 | Ronne | Sept. 19, 1939 |

FOREIGN PATENTS

| Number | Country | Date |
|---|---|---|
| 24,914 | Great Britain | Nov. 1, 1913 |
| 27,019 | Norway | June 19, 1916 |